(12) United States Patent
Kashibuchi et al.

(10) Patent No.: US 8,335,018 B2
(45) Date of Patent: Dec. 18, 2012

(54) IMAGE FORMING METHOD AND APPARATUS FOR REDUCING INPUT IMAGE GRADATION

(75) Inventors: Yoichi Kashibuchi, Tokyo (JP); Hiroshi Kaburagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 12/484,923

(22) Filed: Jun. 15, 2009

(65) Prior Publication Data

US 2009/0316214 A1 Dec. 24, 2009

(30) Foreign Application Priority Data

Jun. 18, 2008 (JP) ................................. 2008-159321

(51) Int. Cl.
*G06K 15/00* (2006.01)
(52) U.S. Cl. ...................... 358/3.13; 358/3.14; 358/3.16; 358/521
(58) Field of Classification Search .................. None
See application file for complete search history.

(56) References Cited

U.S. PATENT DOCUMENTS

| | | | |
|---|---|---|---|
| 5,805,738 A * | 9/1998 | Kaburagi et al. ............ | 382/251 |
| 6,268,838 B1 * | 7/2001 | Kim ................................. | 345/63 |
| 6,462,838 B1 * | 10/2002 | Hirata et al. .................. | 358/3.05 |
| 6,836,346 B2 * | 12/2004 | Yoshizawa et al. ............ | 358/1.9 |
| 7,286,266 B2 * | 10/2007 | Fujita ............................ | 358/3.06 |
| 7,289,093 B2 * | 10/2007 | Uchiyama ....................... | 345/89 |
| 7,339,557 B2 * | 3/2008 | Ochi ............................... | 345/63 |
| 7,508,544 B2 * | 3/2009 | Kakutani ....................... | 358/1.9 |
| 7,593,135 B2 * | 9/2009 | Luo et al. ....................... | 358/3.21 |
| 7,660,017 B2 * | 2/2010 | Karito .......................... | 358/3.14 |
| 2006/0193009 A1 * | 8/2006 | Kakutani ..................... | 358/3.03 |

FOREIGN PATENT DOCUMENTS

| | | | |
|---|---|---|---|
| JP | 59-070078 A | | 4/1984 |
| JP | 01121930 A | * | 5/1989 |
| JP | 11-328389 A | | 11/1999 |
| JP | 2000-244734 A | | 9/2000 |
| JP | 2005354533 | * | 12/2005 |

* cited by examiner

*Primary Examiner* — Dung Tran
(74) *Attorney, Agent, or Firm* — Canon U.S.A., Inc. IP Division

(57) ABSTRACT

An image forming apparatus includes a storage unit configured to store a divisor matrix including at least two kinds of divisor values, and a changing unit configured to change M (M>N) gradation image data into N (N>3) gradation image data, wherein the changing unit is configured to divide a pixel value of a target pixel of the M gradation image data by a divisor value corresponding to a pixel position of the target pixel to change the M gradation image data into the N-gradation image data.

18 Claims, 14 Drawing Sheets

FIG. 2B
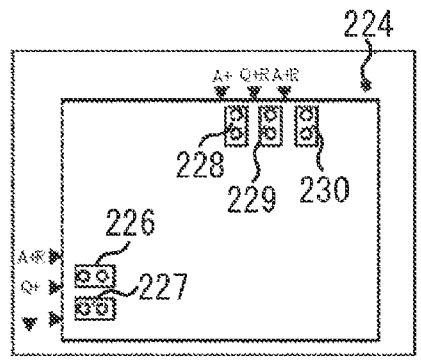
FIG. 2A
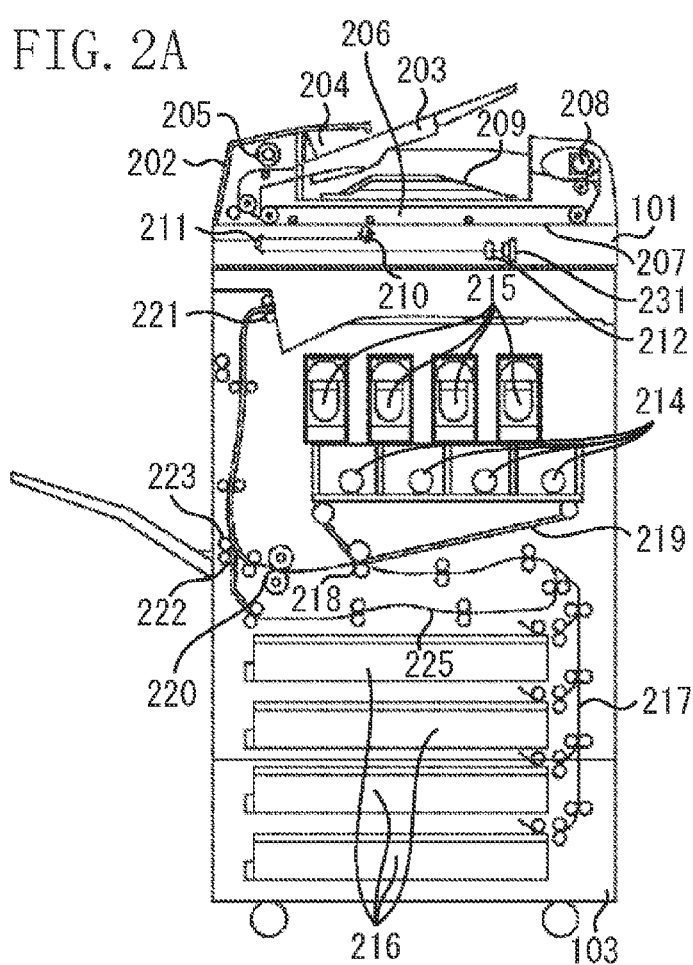
FIG. 2C

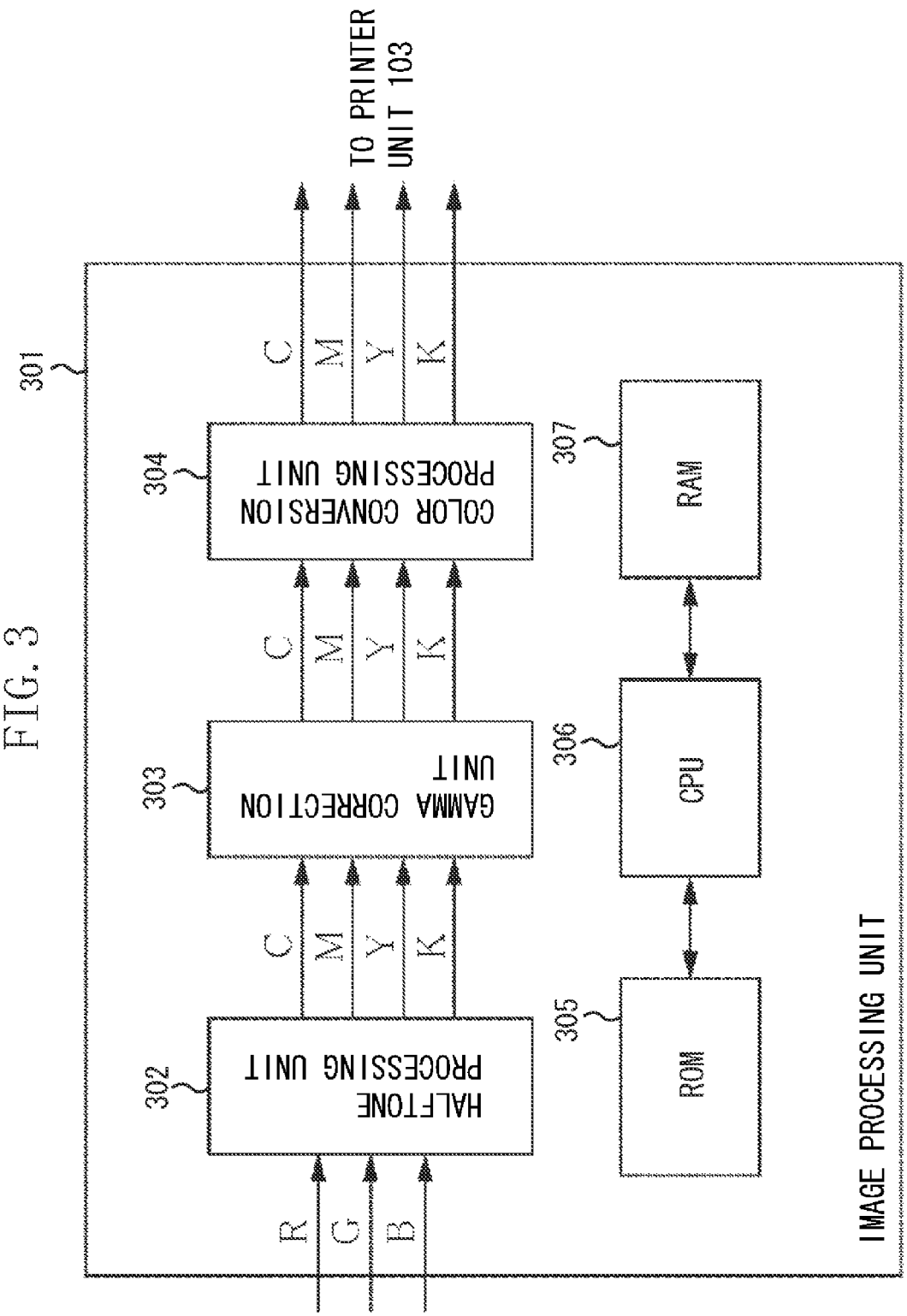

PRIOR ART

IMAGE FORMING METHOD AND APPARATUS FOR REDUCING INPUT IMAGE GRADATION

BACKGROUND OF THE INVENTION

1. Field of the Invention

The present invention relates to an image forming apparatus and an image processing method that can convert image data of M (M>N) gradations into image data of N (N>3) gradations, and also relates to a computer-readable storage medium storing a program to enable an apparatus to execute the image processing method.

2. Description of the Related Art

For example, when a printer processes image data to be printed that have pixel values of multiple gradations (e.g., 256 gradations), the printer performs halftone processing on the image data to change the gradations of the pixel values according to the number of output gradations of the printer. In general, a multi-level dither method is usable to convert the multi-gradational data into 4-bit or lower data.

The multi-level dither method includes storing, in a memory, threshold matrices each having an arbitrary size, as illustrated in FIG. 10, by an amount corresponding to the number of output gradations of a printer (e.g., 15 matrices for 4-bit data) and reading thresholds corresponding to respective pixels by an amount corresponding to the number of output gradations of the printer.

The multi-level dither method further includes comparing the readout thresholds, whose number is equal to the number of output gradations of the printer, with the respective pixel values to attain conversion into the number of output gradations of the printer. However, according to this method, it is necessary to store a plurality of threshold matrices whose number is equal to the number of output gradations. If the resolution of the printer is doubled, a memory amount required for the threshold matrices is four times as large as a memory amount required for a non-doubled printer. It is, therefore, difficult to reduce the cost of the printer and increase the resolution.

On the other hand, as discussed in Japanese Patent Application Laid-Open No. 2000-244734, there is a conventional method for realizing a multi-level dither method that does not use threshold matrices the total number of which is equal to the number of output gradations of the printer. This method uses a basic dither matrix and a multi-valued table that can be obtained based on offset values. According to this method, the multi-level dither method can be realized without using a plurality of threshold matrices the total number of which is equal to the number of output gradations of the printer.

A conventional technique discussed in Japanese Patent Application Laid-Open No. 11-328389 changes image data of 256 gradations to image data of 16 gradations by adding random numbers (e.g., 0 to 16) to the pixel values of the image data and then dividing summed-up values by 17.

However, according to the method discussed in Japanese Patent Application Laid-Open No. 2000-244734, the offset values are uniform irrespective of the position in the basic dither matrix and an increment amount of an output value does not change depending on the position in the matrix. On the other hand, according to the method discussed in Japanese Patent Application Laid-Open No. 11-328389, divisors are constant and, therefore, the increment amount of the output value does not change depending on the position in the matrix.

If the increment amount of the output value cannot be changed for each pixel position, the following problem may arise. In a case where a printer is an electrophotographic type, a photosensitive member is irradiated with a recording laser beam and causes a toner charged to have a positive potential to adhere to a region whose electric potential is equal to or less than a predetermined value. Then, a toner image thus formed is transferred to a recording sheet. Thus, print image data (i.e., image data to be printed) can be expressed by printing.

FIG. 11 illustrates electric potential of a photosensitive member irradiated with a recording laser beam, in relation to respective pixels of image data to be printed. In FIG. 11, V represents an initial potential of the photosensitive member. When the electric potential decreases below Vs due to irradiation of the recording laser beam, toner particles can adhere to a recording sheet. For example, in a region 1101 illustrated in FIG. 11, the electric potential is equal to or less than Vs. The region 1101 has a size equivalent to only one pixel. Therefore, one pixel corresponding to the region 1101 can be expressed as a black region.

It is generally recognized that, in a medium density region, the image quality can be stabilized if the increment of an output value is expressed as a line-like halftone dot shape compared to a dot-like halftone dot shape.

FIGS. 12A to 12E illustrate examples of the increment of an output value of print image data in the medium density region. To increase the output value of an image illustrated in FIG. 12A, if the output value of the print image data increases in a dot-like fashion as illustrated in FIG. 12B, a print image may not be expressed as a smooth image (see FIG. 12C). On the other hand, if the output value of the print image data gradually increases as illustrated in FIG. 12D, for example, by the increments of a smaller value for respective pixels, an output value increases in a linear fashion. As a result, a print image can be expressed as a smooth image (see FIG. 12E). This is the reason why it is desired to increase the output value of the print image data in a linear fashion in the medium density region.

The reproducibility may deteriorate if, in a low-density region or in a high-density region, the increment of the output value is expressed by a line-like halftone dot shape.

FIGS. 13A and 13B illustrate two examples of the output value of the print image data that increases in the low-density region. FIG. 13A illustrates an output value of print image data that increases in a linear fashion in a low-density region. In this case, a very narrow range of the photosensitive member is irradiated with a recording laser beam as indicated by a region 1102 in FIG. 11.

The recording laser beam has a weak charge and, therefore, the electric potential of the photosensitive member does not decrease below Vs. Therefore, the output value does not increase so much, and the change may not be visually recognized on a printed result. On the other hand, if the output value increases in a dot-like fashion as illustrated in FIG. 13B, an increment of an output value can be clearly recognized. In this respect, increasing the output value in a dot-like fashion is effective.

It is now assumed to increase an output value of a white portion of an image that is almost shared by a black region, as illustrated in FIG. 14A, in the high-density region. In this case, if the output value of the image data to be printed is increased in a line state as illustrated in FIG. 14B, the white portion may not be clearly discriminated from neighboring black-color pixels and, therefore, the entire image may become dark.

As a result, a printed image may be recognized as a black region as illustrated in FIG. 14C. This is because, as indicated by a region 1103 illustrated in FIG. 11, if the clearance between two recording laser beams is excessively narrow, the minus electric charges of two beams are added in the narrow clearance and the electric potential possibly decreases below Vs. On the other hand, if the output value of the image data to be printed is increased in a dot-like pattern as illustrated in FIG. 14D, an increment of the output value in the high-density region can be clearly recognized on a printed image as illustrated in FIG. 14E.

As described above, it is necessary to combine appropriate halftone dot patterns to select the method for increasing the output value of image data to be printed depending on each density region. However, in a case where the increment amount of the output value cannot be changed for each position in the matrix, a halftone dot pattern resulting from the increment of the output value becomes uniform. Therefore, it is difficult to increase the output value so that the halftone dot pattern appears as a dot state in the low-density region, a line state in the medium density region, and a dot state in the high-density region, for example, as illustrated in FIG. 9.

SUMMARY OF THE INVENTION

Exemplary embodiments of the present invention are directed to a technique capable of overcoming or at least mitigating the above-described problems.

According to an aspect of the present invention, an image forming apparatus includes a storage unit configured to store a divisor matrix including divisor values that are variable for respective positions in the matrix, and a changing unit configured to change M (M>N) gradation image data into N (N>3) gradation image data, wherein the changing unit is configured to divide a pixel value of a target pixel of the M gradation image data by a divisor value corresponding to a pixel position of the target pixel to change the M gradation image data into the N gradation image data.

According to an exemplary embodiment of the present invention, an increment amount of an output value can be changed for each position in the matrix in the multi-level dither method. An exemplary embodiment of the present invention can realize the multi-level dither method with a smaller memory amount based on calculations using two matrices, regardless of the number of output gradations of a printer. Further, an exemplary embodiment of the present invention can store a matrix of divisor values that are variable for respective positions in the matrix. Therefore, the increment amount of an output value corresponding to an input pixel value can be controlled for each position in the matrix. Accordingly, an exemplary embodiment of the present invention can realize a multi-level dither method for forming an optimum halftone dot pattern according to characteristics of each density region. For example, according to an exemplary embodiment of the present invention, the halftone dot pattern appears as a dot state in the low-density region, a line state in the medium density region, and a dot state in the high-density region.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 2A is a cross-sectional view of an image forming apparatus according to a first exemplary embodiment.

FIG. 2B is a plan view illustrating a document positioning plate according to the first exemplary embodiment.

FIG. 2C is a side view of the document positioning plate according to the first exemplary embodiment.

FIG. 3 is a block diagram illustrating a configuration for processing image date to be printed according to an exemplary embodiment of the present invention.

DETAILED DESCRIPTION OF THE EMBODIMENTS

Figure 1:
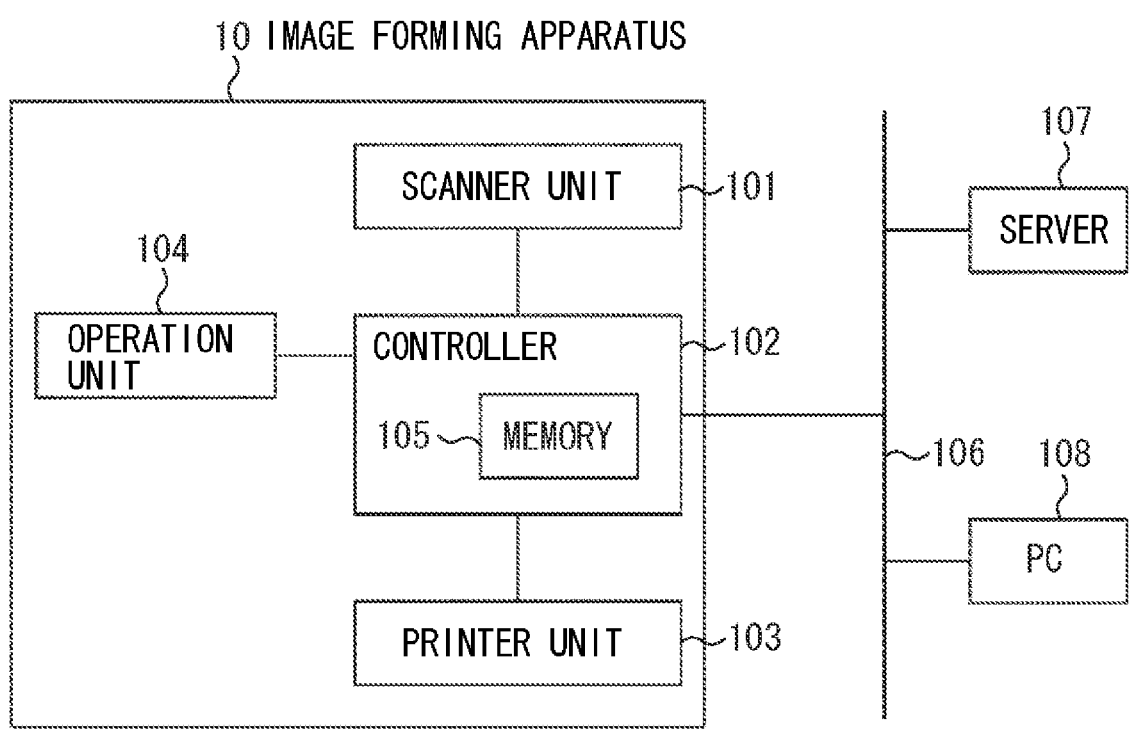
FIG. 1 is a block diagram illustrating an image forming apparatus according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

FIG. 1 is a block diagram illustrating an image forming apparatus 10 according to an exemplary embodiment of the present invention. The image forming apparatus 10 is a general digital multifunction peripheral having copy, print, and facsimile functions. The image forming apparatus 10 includes a scanner unit 101 configured to read a document (i.e., an original) and a controller 102 configured to perform image processing on image data read by the scanner unit 101 and to store the processed image data as image data to be printed having input pixel values in a memory 105. The image forming apparatus 10 further includes an operation unit 104 configured to enable users to set various print conditions relating to the image data to be printed. The image forming apparatus 10 further includes a printer unit 103 configured to print image data that can be read from the memory 105 on a recording sheet according to the print conditions set by the operation unit 104. The image forming apparatus 10 is connected, via a network 106, to a server 107, which can manage various image data, and a personal computer (PC) 108, which can instruct the image forming apparatus 10 to execute printing.

In the present exemplary embodiment, the number of output gradations of the image forming apparatus 10 is 4-bit (16). The number of gradations of the image data to be printed, which is read from the scanner unit 101 and stored in the memory 105 by the controller 102, is 256.

In the present exemplary embodiment, it is assumed that M gradation image data is image data to be printed that has the number of gradations of 256 and N gradation image data is image data to be printed that has the number of gradations of 16. In this case, an output value of the image forming apparatus 10 is in a range from 0 to 15. The maximum value of the output value is 15. The parameters M and N, each representing the number of gradations, satisfy the relationship M>N, in which M and N are integers. A conventional multi-level dither method requires a total of three threshold matrices if the parameter N is equal to 4. However, the number of matrices that may be used in the present exemplary embodiment is less than three. Therefore, compared to the conventional multi-level dither method, the present exemplary embodiment can reduce a required memory capacity. Therefore, N>3 is desired.

FIG. 2A is a cross-sectional view of the image forming apparatus 10. A detailed configuration of the image forming apparatus 10 illustrated in FIG. 1 is described with reference to FIG. 2A. The image forming apparatus 10 has copy, print, and facsimile functions. As illustrated in FIG. 2A, the image forming apparatus 10 includes the scanner unit 101, a document feeder (DF) 202, and the printer unit 103 equipped with four color drums usable for printing and recording. FIGS. 2B and 2C are a plan view and a side view of a document positioning plate 207, respectively.

An example reading operation that can be mainly performed by the scanner unit 101 is described below. First, to cause the scanner unit 101 to perform a reading operation, a user sets a document (i.e., an original) on the document positioning plate 207 and closes the DF 202. An open/close sensor 224 detects the closure of the document positioning plate 207. Subsequently, document size detection sensors 226 to 230, which are light-reflection type and provided in a casing of the scanner unit 101, detect a size of the set document. Based on a result of the size detection, a light source 210 emits light toward the document. A charge-coupled device (CCD) 231 receives reflection light from the document via a reflection plate 211 and a lens 212 and reads an image of the document. Then, the controller 102 of the image forming apparatus 10 converts the image data read by the CCD 231 into digital signals. The controller 102 performs scanner image processing on the signals and stores, as image data to be printed, in the memory 105 of the controller 102. In this case, the image data to be printed can be constituted by three-color signals of red, green, and blue.

To cause the DF 202 to perform a reading operation, a user places a document in a face-up state on a tray of a document set portion 203 of the DF 202. A document presence sensor 204 detects the document having been set on the tray. In response to this detection, a document feeding roller 205 and a conveyance belt 206 start rotating to cooperatively convey the document until the document can be set to a predetermined position of the document positioning plate 207. Similar to the above-described reading operation, image data of the document set on the document positioning plate 207 is read and stored as image data to be printed in the memory 105 of the controller 102.

After the reading operation is completed, the conveyance belt 206 rotates again to send the document to the right side in the cross-sectional view of the image forming apparatus 10 illustrated in FIG. 2A. The document is discharged to a document discharge tray 209 via a discharge side conveyance roller 208. If two or more documents are present, the document is discharged and conveyed from the document positioning plate 207 to the right side in the cross-sectional view of the image forming apparatus 10. At the same time, the next document is fed via the document feeding roller 205 from the left side in the cross-sectional view of the image forming apparatus 10. The scanner unit 101 continuously performs a reading operation for the next document.

Next, an example print operation that can be mainly performed by the printer unit 103 is described below. The image data to be printed, which has been previously stored in the memory 105 of the controller 102, is subjected to print image processing again in the controller 102 and is then transferred to the printer unit 103. The printer unit 103 converts the image data to be printed into pulse signals under the PWM control that can be performed by the printer unit 103. A laser recording unit converts the pulse signals into four-color (e.g., yellow, magenta, cyan, and black) recording laser beams.

Figure 11:
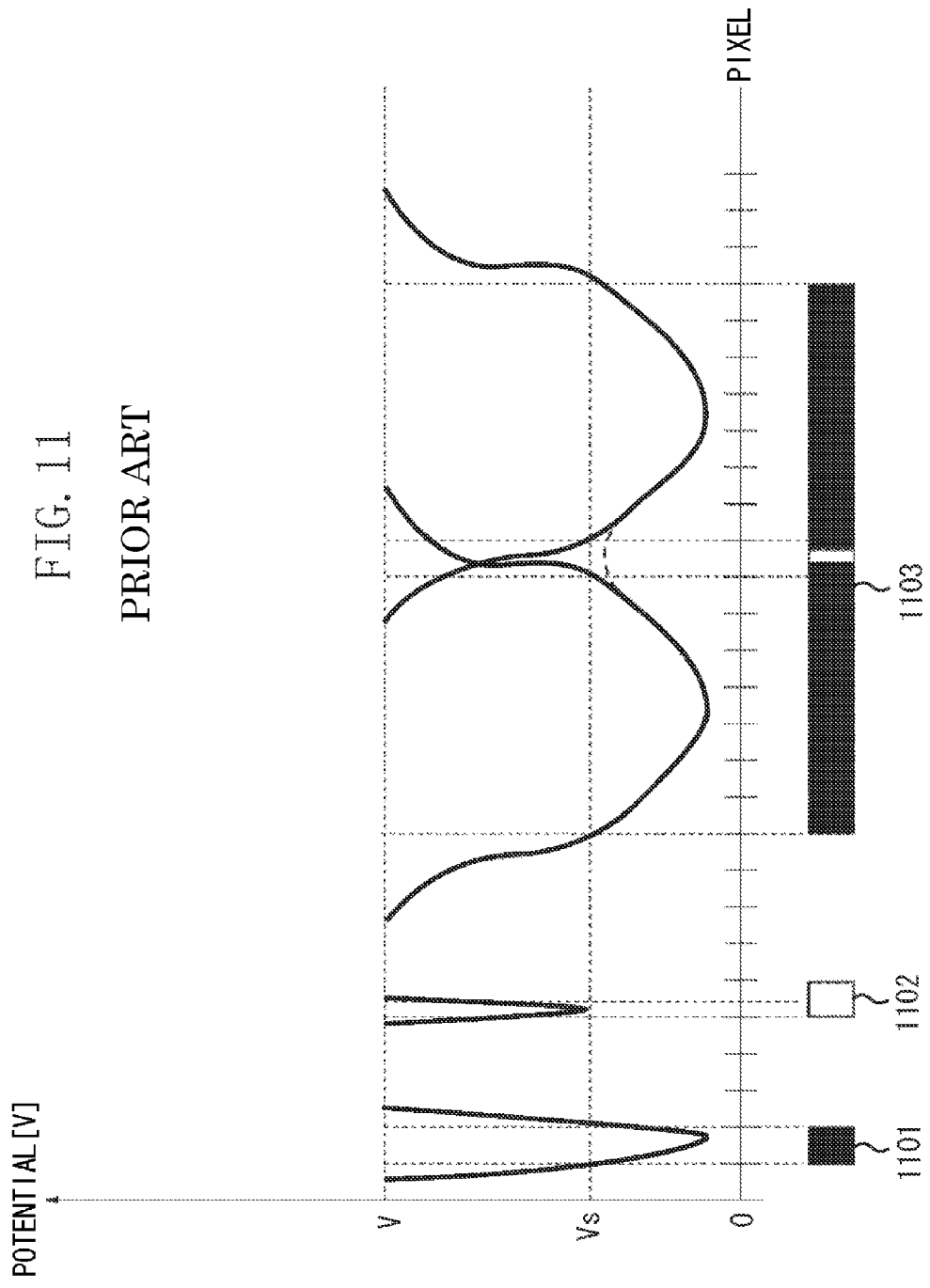
FIG. 11 illustrates electric potential of a photosensitive member in relation to respective pixels of image data to be printed.
Figure 12C:
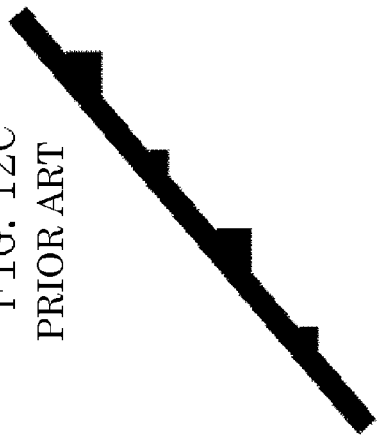
FIG. 12C illustrates a printed image in a case where the output value increases in the dot-like fashion in the medium density region.
Figure 12E:
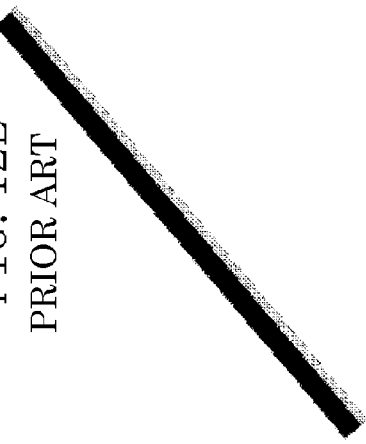
FIG. 12E illustrates a printed image in a case where the output value increases in the linear fashion in the medium density region.
Figure 12B:
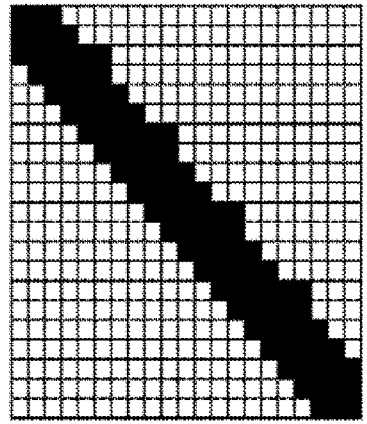
FIG. 12B illustrates example image data to be printed in a case where an output value increases in a dot-like fashion in the medium density region.
Figure 12D:
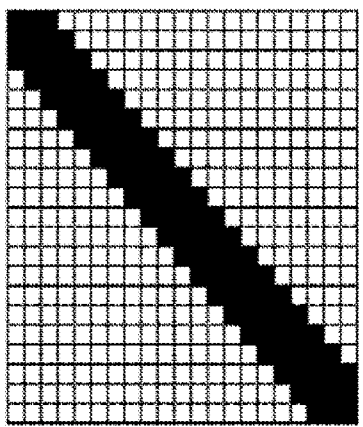
FIG. 12D illustrates image data to be printed in a case where an output value increases in a linear fashion in the medium density region.
Figure 12A:
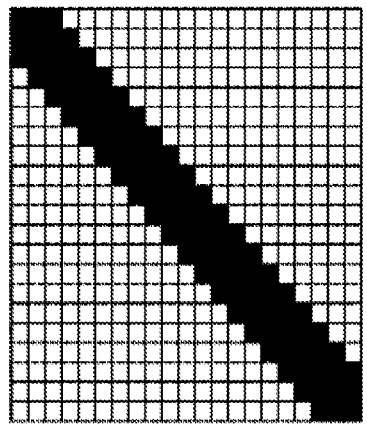
FIG. 12A illustrates example image data to be printed in a medium density region.
Figure 13A:
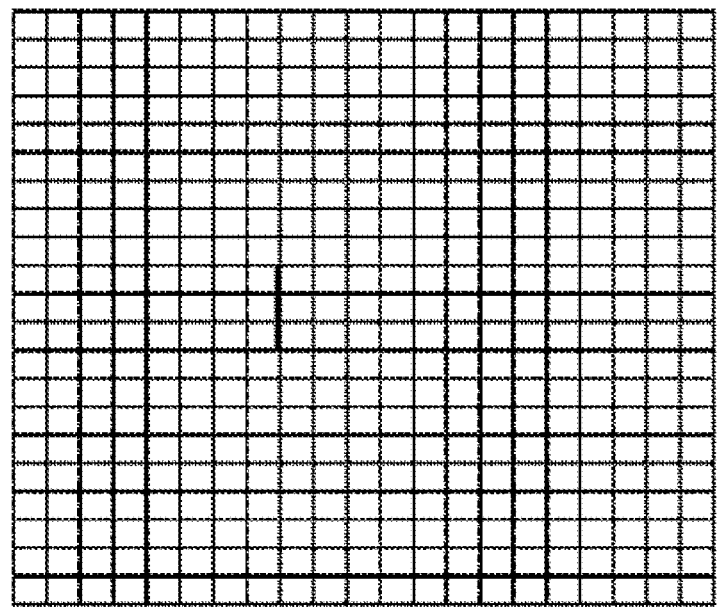
FIG. 13A illustrates image data to be printed in a case where an output value increases in a linear fashion in a low-density region.
Figure 13B:
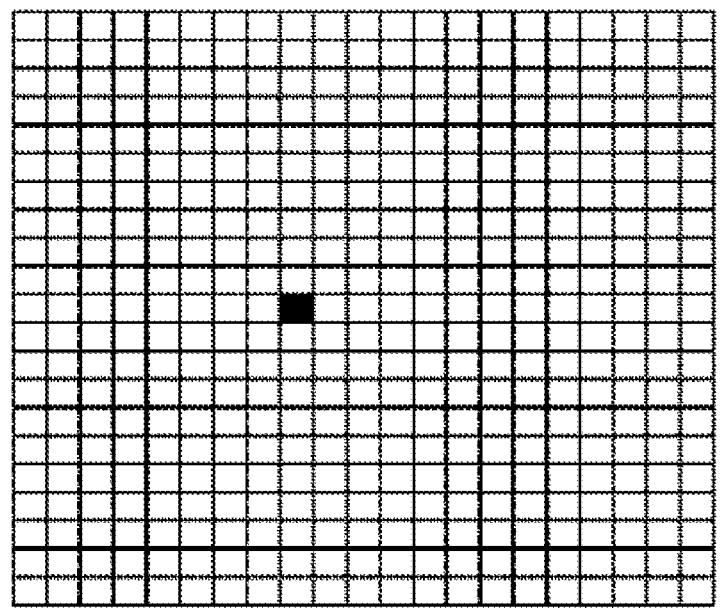
FIG. 13B illustrates image data to be printed in a case where an output value increases in a dot-like fashion in a low-density region.
Figure 14C:
FIG. 14C illustrates a printed image in a case where an output value increases as a dot-like fashion in a high-density region.
Figure 14E:
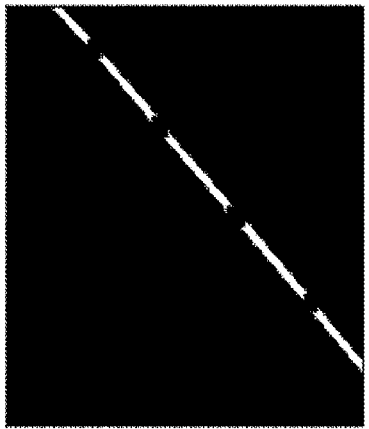
FIG. 14E illustrates a printed image in a case where an output value increases in a linear fashion in a high-density region.
Figure 14B:
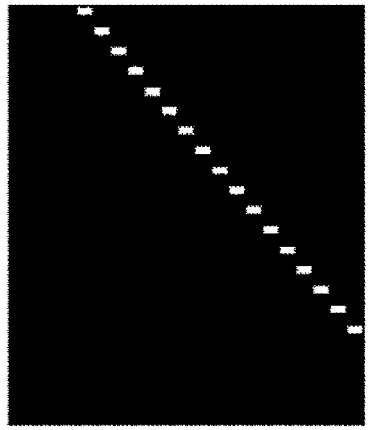
FIG. 14B illustrates example image data to be printed in a case where an output value increases in a dot-like fashion in a high-density region.
Figure 14D:
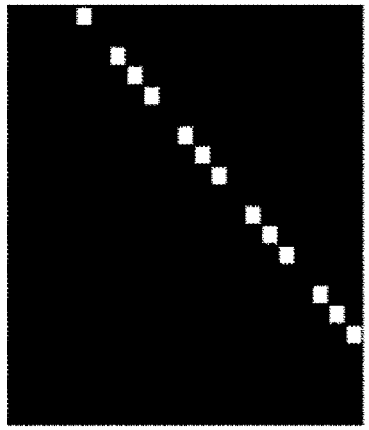
FIG. 14D illustrates example image data to be printed in a case where an output value increases in a linear fashion in a high-density region.
Figure 14A:
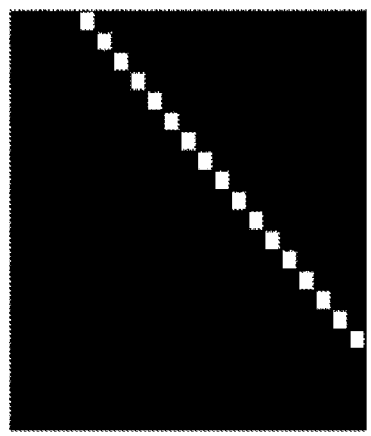
FIG. 14A illustrates example image data to be printed in a high-density region.

When a photosensitive member 214 of each color is irradiated with a recording laser beam charged by a minus voltage, an electrostatic latent image is formed on the photosensitive member 214. The printer unit 103 can develop a toner image on each photosensitive member, at a region where the electric potential is equal to or less than a predetermined value, with toner particles that can be supplied from a toner cartridge 215. The toner image made visible on each photosensitive member is primarily transferred to an intermediate transfer belt 219. The intermediate transfer belt 219 rotates in the clockwise direction in FIG. 2A. When a recording sheet that may be fed from a sheet cassette 216 via a paper-feeding conveyance path 217 reaches a secondary transfer position 218, the toner image is transferred from the intermediate transfer belt 219 to the recording sheet. In this case, the electric potential of each photosensitive member that is irradiated with a recording laser beam and the toner image at each pixel are in a relationship similar to that illustrated in FIG. 11.

A fixing unit 220 can apply an appropriate amount of pressure and heat on the toner image transferred on the recording sheet to fix the image. The recording sheet carrying the toner image fixed thereon can be conveyed via a discharge conveyance path to a center tray 221 where the sheet can be discharged in a face-down state or to a side tray 222 where the sheet can be discharged in a face-up state. A flapper 223 can switch the conveyance path to guide a sheet to different discharge ports. When the image forming apparatus 10 performs a two-sided print operation, the flapper 223 switches the conveyance path after a recording sheet has passed through the fixing unit 220. The recording sheet performs a switch-back motion and moves downward, via a two-sided print sheet conveyance path 225, to the secondary transfer position 218 where a two-sided print can be performed on the recording sheet.

An example print image processing is described below in detail with reference to FIG. 3. FIG. 3 is a block diagram illustrating an example configuration for processing image date to be printed. In FIG. 3, an image processing unit 301 is configured to perform the print image processing in the controller 102. The image data to be printed, which is temporarily stored in the memory 105 of the controller 102, is 8-bit pixel data. One pixel has a pixel value in a range of 0 to 255. An 8-bit pixel can express 256 gradations. A color conversion processing unit 302 is configured to convert three colors of red, green, and blue into four colors of yellow, magenta, cyan, and black for each pixel of the image data to be printed that can be input from the memory 105. A gamma correction unit 303 is configured to perform gamma correction processing on each color.

A halftone processing unit 304 is configured to perform halftone processing on input image data to be printed for each color. Trough the halftone processing by the halftone processing unit 304, the 8-bit image data can be changed into 4-bit image data (i.e., the number of output gradations that can be processed by the printer unit 103). Then, the halftone processing unit 304 sends the 4-bit print image data to the printer unit 103. In this case, the 4-bit print image data has a pixel value of each pixel that is equal to an output value that can be determined by the halftone processing unit 304.

A central processing unit (CPU) 306 can control various operations that can be performed by the image processing unit 301 according to a control program stored in a read only memory (ROM) 305. A random access memory (RAM) 307 can serve as a working area of the CPU 306. The RAM 307 can store a basic dither matrix and a divisor matrix.

Example halftone processing for changing the number of gradations of input print image data, which can be performed by the halftone processing unit 304, is described below with reference to FIGS. 4, 5, 6, and 7. The halftone processing unit 304 performs the halftone processing for each of yellow, magenta, cyan, and black colors. The following is a method for processing a black color, although the method can be equally applied to other colors.

Figure 4:
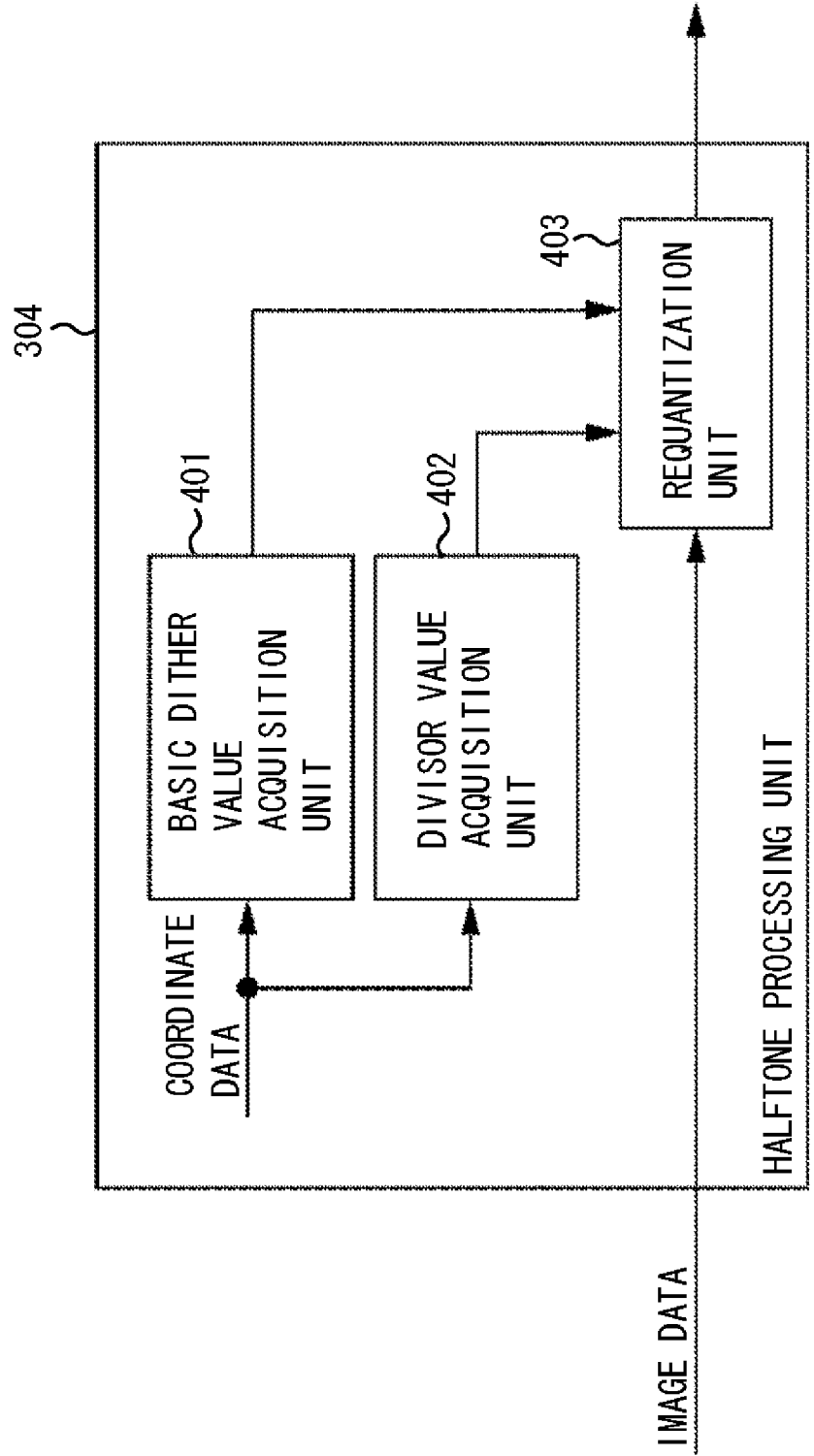
FIG. 4 is a block diagram illustrating a halftone processing unit according to an exemplary embodiment of the present invention.
Figure 5:
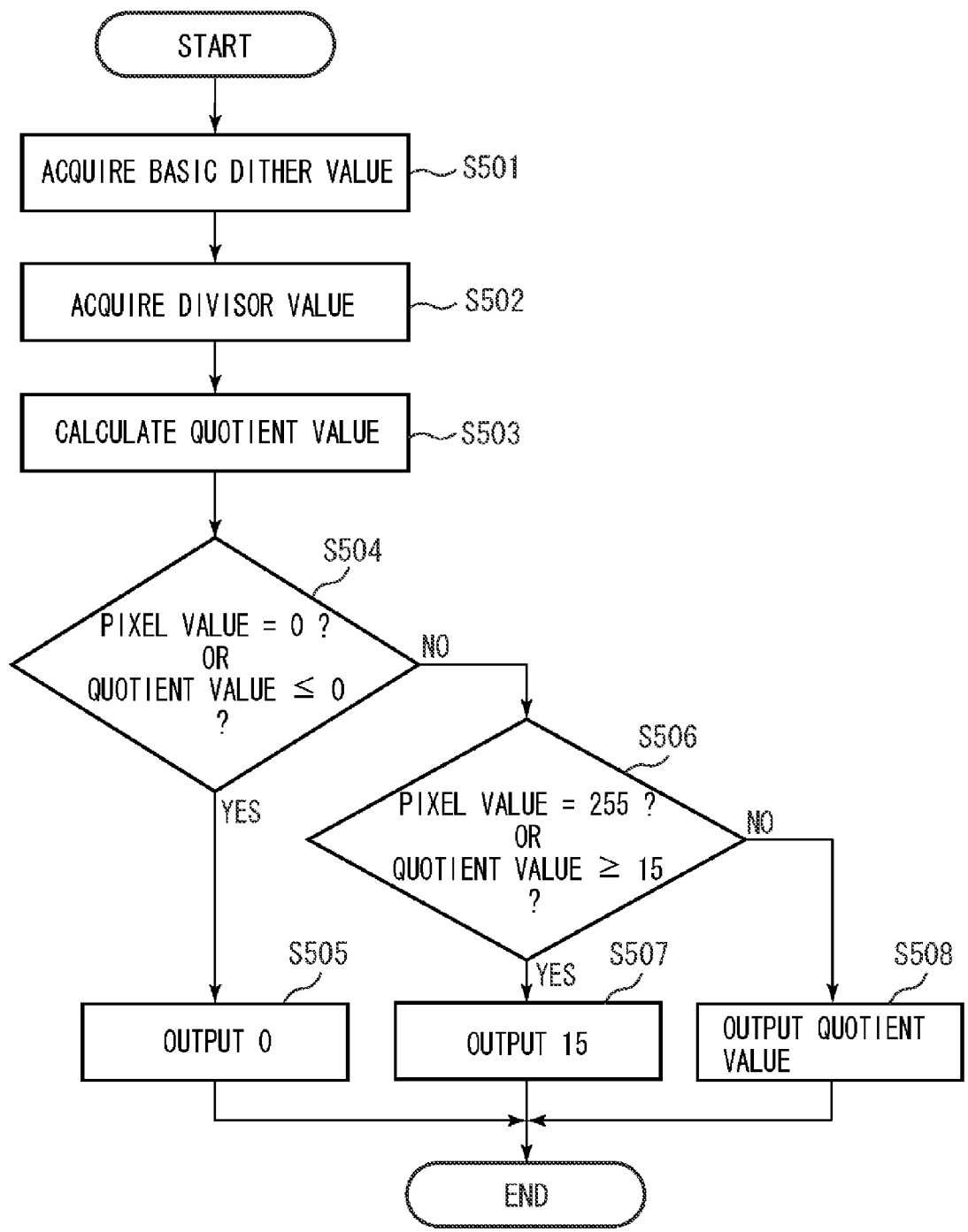
FIG. 5 is a flowchart illustrating example halftone processing according to an exemplary embodiment of the present invention.
Figure 6:
FIG. 6 illustrates an example of a basic dither matrix according to an exemplary embodiment of the present invention.
Figure 7:
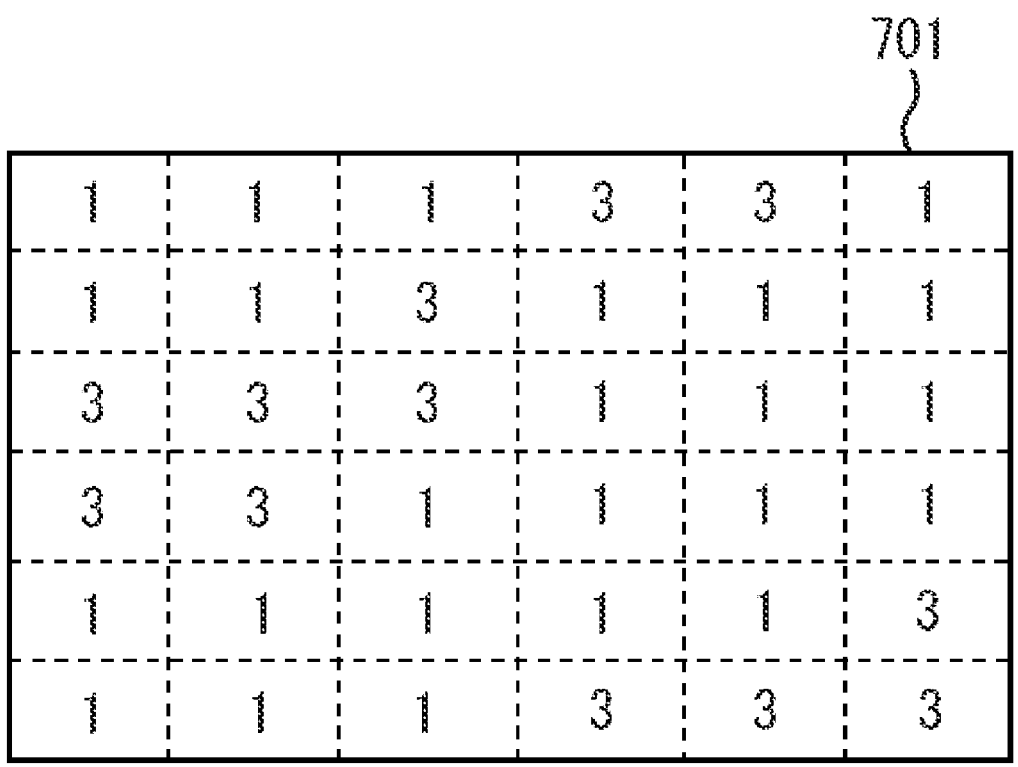
FIG. 7 illustrates an example of a divisor matrix according to an exemplary embodiment of the present invention.

FIG. 4 is a block diagram illustrating the halftone processing unit 304. FIG. 5 is a flowchart illustrating example halftone processing that can be performed by the halftone processing unit 304. FIG. 6 illustrates an example of a basic dither matrix 601 that can be used by the halftone processing unit 304. FIG. 7 illustrates an example of a divisor matrix 701 that can be used by the halftone processing unit 304.

In step S501, a basic dither value acquisition unit 401 acquires, from the basic dither matrix 601, a basic dither value BASE of a coordinate position that corresponds to the coordinate position of a target pixel of the input image data to be printed. The basic dither matrix 601 is a 6×6 matrix, which includes a total of 36 basic dither values arranged in a two-dimensional pattern (i.e., six dither values in the width direction and six dither values in the height direction). The basic dither values can be changed for respective positions in the matrix. In the present exemplary embodiment, each pixel value is in the range from 0 to 255 and a printable output gradation is in the range from 0 to 15. Therefore, each basic dither value is in a range from 0 to 240 (=255−15). The following is the reason why the maximum value of a basic dither value is 240.

If the basic dither value is larger than 240, even when an input pixel value is 255 (i.e., the maximum value), a value obtained by reducing the basic dither value from the pixel value becomes smaller than 15. Therefore, for example, an image of a fully black region whose pixel values are all 255 (i.e., black) cannot be reproduced. Therefore, the maximum value of a basic dither value is equal to 240, which can be obtained by subtracting the maximum value of the printable output gradation from the maximum value of the pixel value.

In the present exemplary embodiment, the gradation of the image data to be printed is 256 and the number of output gradations of the image forming apparatus 10 is 16. Therefore, the maximum value of a basic dither value becomes 240. If the gradation of input image data to be printed or the number of output gradations of the image forming apparatus 10 is changed, the maximum value of a basic dither value may change according to the changed value. In this case, if M represents the gradation of input image data to be printed and N represents the number of output gradations, the maximum value of a basic dither value is equal to M−N.

If a target pixel of input image data to be printed has coordinate values (y, x), the following formulae define a coordinate position (j, i) of the target pixel on the basic dither matrix 601.

$$j = y \text{ MOD } H$$

$$i = x \text{ MOD } W$$

In the above formulas, MOD represents a modulo operation. More specifically, "j" represents a remainder that can be obtained when "y" is divided by H and "i" represents a remainder that can be obtained when "x" is divided by W. W represents the width of the basic dither matrix 601, and H represents the height of the basic dither matrix 601.

In step S502, a divisor value acquisition unit 402 acquires, from the divisor matrix 701, a divisor value DIVISOR of the coordinate position (j, i) corresponding to the coordinates (y, x) of the target pixel of the input image data to be printed. The divisor matrix 701, which has a size similar to that of the basic dither matrix 601, includes 36 divisor values that can be changed for respective positions in the matrix. When each divisor value of the divisor matrix 701 is variable, the increment amount of an output value can be changed for each position in the matrix. A method for obtaining the coordinate data corresponding to a target pixel is similar to that described above for the basic dither matrix.

In the present exemplary embodiment, the maximum value of an input pixel is 255 and the maximum output gradation of the image forming apparatus 10 is 15. Therefore, the maximum value of a divisor value is equal to 16. For example, if the divisor value is 17, a division result obtainable from the pixel value 255 may become smaller than 15. As a result, an image of a fully black region cannot be reproduced. The maximum value of a divisor value becomes 16 when a decimal part of a later-described quotient value QU is rounded down and becomes 17 when the decimal part is rounded up.

If the gradation of input print image data or the number of output gradations of the image forming apparatus 10 is changed, the maximum value of a divisor value changes according to the changed value. In this case, if M represents the gradation of the input print image data and N represents the number of output gradations, the maximum value of the divisor value becomes M/N when the decimal part is rounded down and becomes M/N+1 when the decimal part is rounded up. However, it is desired that the maximum value of the divisor value is equal to or less than W×H when W represents the width of the divisor matrix and H represents the height of the divisor matrix, because of the reason described below.

In step S503, a requantization unit 403 calculates the quotient value QU based on a pixel value IN of the target pixel of the input image data to be printed, the basic dither value BASE obtained in step S501, and the divisor value DIVISOR obtained in step S502. The calculation method can include subtracting the basic dither value BASE corresponding to the pixel position of the target pixel from the pixel value IN of the target pixel, and can further include dividing the subtracted pixel value of the target pixel (i.e., a value having 256 gradations) by the divisor value DIVISOR corresponding to the pixel position of the target pixel to obtain the quotient value QU.

In the present exemplary embodiment, the quotient value QU is desired to be an integer value so that the present exemplary embodiment can be realized by a hardware configuration of the image forming apparatus 10. Therefore, if a division result includes a decimal part, the decimal part is rounded down to obtain an integer value. Alternatively, the quotient value QU can be an integer value obtainable as a quotient of a division instead of rounding down the decimal part. In a case where the present exemplary embodiment can be realized by a software configuration, the quotient value QU can be a value including a decimal part.

It may be useful to round up the decimal part by calculating the quotient value QU according to the following formula:

$$QU=(IN+(DIVISOR-1)-BASE) \div DIVISOR$$

More specifically, if the divisor value DIVISOR is equal to 1, the quotient value QU can be obtained by subtracting the basic dither value BASE from the pixel value IN. If the divisor value DIVISOR is greater than 1, the quotient value QU becomes a smaller value. As the decimal part of the quotient value QU is rounded down, the decimal part can be rounded up by adding (DIVISOR−1) to the pixel value IN.

The following is the reason why the divisor value is desired to be equal to or less than W×H. The divisor matrix 701 has a height H corresponding to six divisor values and a width W corresponding to six divisor values. In this case, the maximum value of the divisor value is 36 (=W×H). It is now assumed that each divisor value DIVISOR of the divisor matrix 701 is 36 and the basic dither value BASE of the basic dither matrix 601 is any one of 0 to 35 different from other dither values.

In this case, the quotient value QU of a different coordinate position increases by 1 in response to an increment of the pixel value IN that can be incremented from 1. Further, the quotient value QU of the same coordinate position increases by 1 in response to an increment of 36 in the pixel value IN.

For example, at the coordinate position where the basic dither value BASE is 0, the quotient value QU is equal to 1 if the pixel value IN is 1. Further, the quotient value QU is equal to 2 if the pixel value IN is 37. However, for example, if each divisor value DIVISOR is equal to or greater than 37, the quotient value QU of any coordinate position may not increase when the pixel value IN is any one of 0 to 37. As a result, no gradations can be realized. Accordingly, the divisor value does not need to be a value greater than W×H. The divisor value is desired to be equal to or less than W×H.

In step S504, the requantization unit 403 determines whether the pixel value IN is equal to the minimum value (i.e., 0) of the image data to be printed, or whether the quotient value QU is equal to or less than 0. If the requantization unit 403 determines that at least one of the above-described conditions is satisfied (YES in step S504), the processing proceeds to step S505. If the requantization unit 403 determines that none of the above-described conditions is satisfied (NO in step S504), the processing proceeds to step S506.

In step S505, the requantization unit 403 sets, as the output value of the halftone processing unit 304, the minimum value (i.e., 0) of the output gradation of the image forming apparatus 10. Determining the output value based on the processing of step S504 is useful to limit the quotient value QU if the quotient value QU (i.e., a result of the above-described calculation) is equal to or less than 0. The output value can be set to a value in the range from 0 to 15.

In step S506, the requantization unit 403 determines whether the pixel value IN is equal to the maximum value (i.e., 255) of the image data to be printed, or whether the quotient value QU is equal to or greater than the maximum value (i.e., 15) of the output value of the halftone processing unit 304. If the requantization unit 403 determines that at least one of the above-described conditions is satisfied (YES in step S506), the processing proceeds to step S507. If the requantization unit 403 determines that none of the above-described conditions is satisfied (NO in step S506), the processing proceeds to step S508.

In step S507, the requantization unit 403 sets, as the output value of the halftone processing unit 304, the maximum value (i.e., 15) of the output gradation of the image forming apparatus 10. Determining the output value based on the determination of step S506 is useful to limit the quotient value QU if the quotient value QU (i.e., a result of the above-described calculation) is equal to or greater than the maximum value (i.e., 15) of the output value. The output value can be set as a value in the range from 0 to 15. In the present exemplary embodiment, the number of gradations of input image data to be printed is 16. Therefore, it is determined whether the quotient value QU is equal to or greater than 15. However, if the number of gradations of input image data to be printed is N, the requantization unit 403 may determine whether the quotient value QU is equal to or greater than N−1.

In step S508, the requantization unit 403 sets, as the output value of the halftone processing unit 304, the quotient value obtained in step S503. In this case, the quotient value is in the range from 0 to 15. Therefore, the 8-bit print image data having a value in the range from 0 to 255 can be converted into 4-bit print image data having a value in the range from 0 to 15.

As described above, through the processes in step S503 and subsequent steps, the pixel value of 256 gradations can be changed into a pixel value of 16 gradations by dividing the subtracted pixel value of 256 gradations by a divisor value. In other words, the M gradation image data can be changed into N gradation image data.

Further, through the processes in step S503 and subsequent steps, the pixel value of 256 gradations can be changed into a pixel value of 16 gradations by subtracting a corresponding basic dither value from the pixel value of input print image data and then dividing the subtracted pixel value of 256 gradations by the divisor value. In other words, the M gradation image data can be changed into N gradation image data. The 4-bit print image data generated by the halftone processing unit 304 can be sent to the printer unit 103.

In the present exemplary embodiment, the image data to be printed is constituted by pixels each having an 8-bit value. However, the print image data may be constituted by pixels each having a 10-bit value. In this case, as described above, the basic dither matrix 601 is required to be set within the range of values (0 to 1023) of the print image data. Accordingly, in step S506, the maximum value of the print image data becomes 1023.

In the present exemplary embodiment, the printer unit 103 has 4-bit output gradations and, therefore, can print 4-bit image data. However, the printer unit 103 may be configured to print, for example, 2-bit image data. In this case, in steps S506 and S507, the maximum value of the output value of the halftone processing unit 304 is equal to 3.

Figure 8:
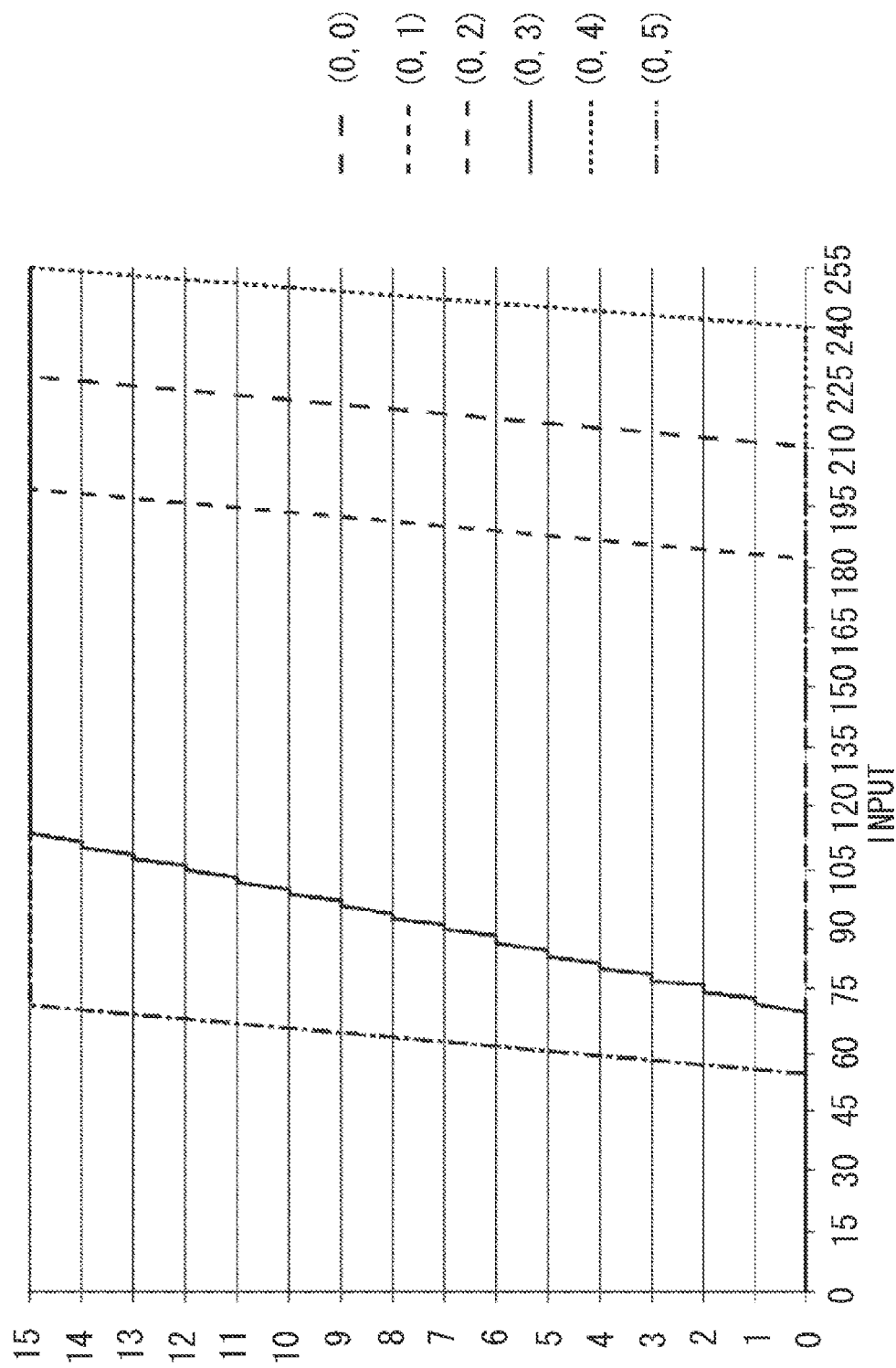
FIG. 8 illustrates an example of a halftone processing result according to an exemplary embodiment of the present invention.
Figure 9:
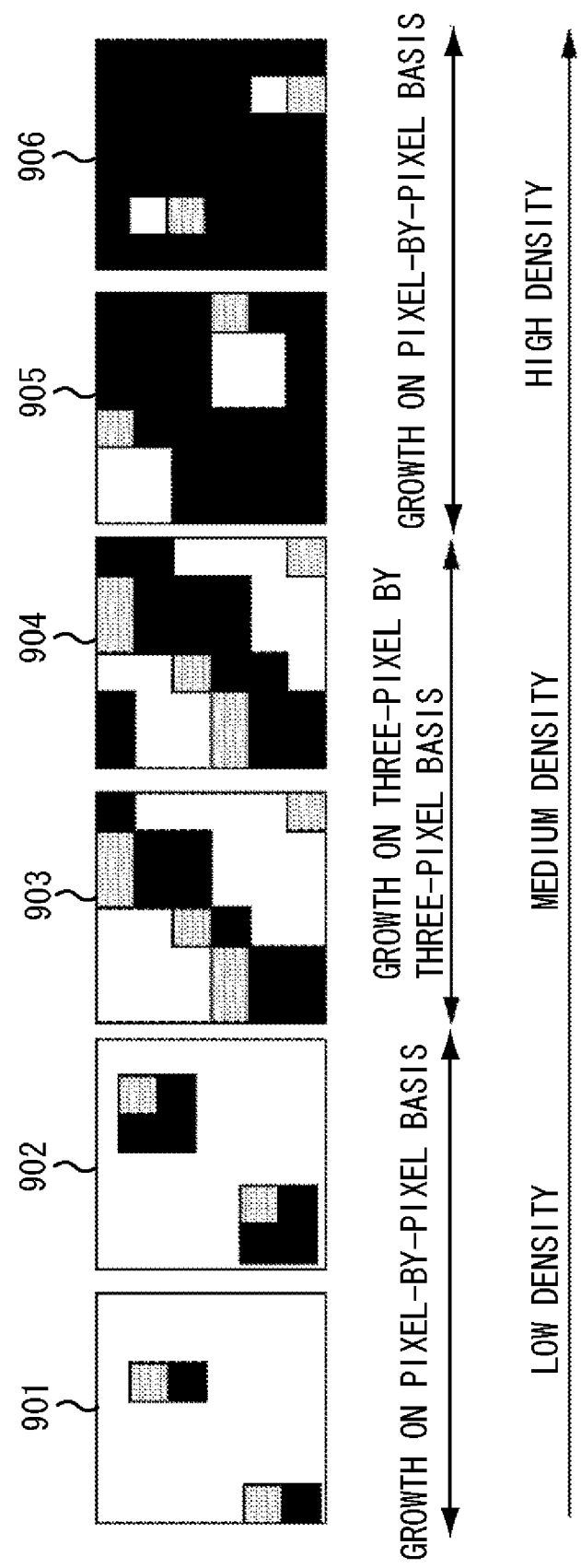
FIG. 9 illustrates an example of a halftone processing result according to an exemplary embodiment of the present invention.
Figure 10:
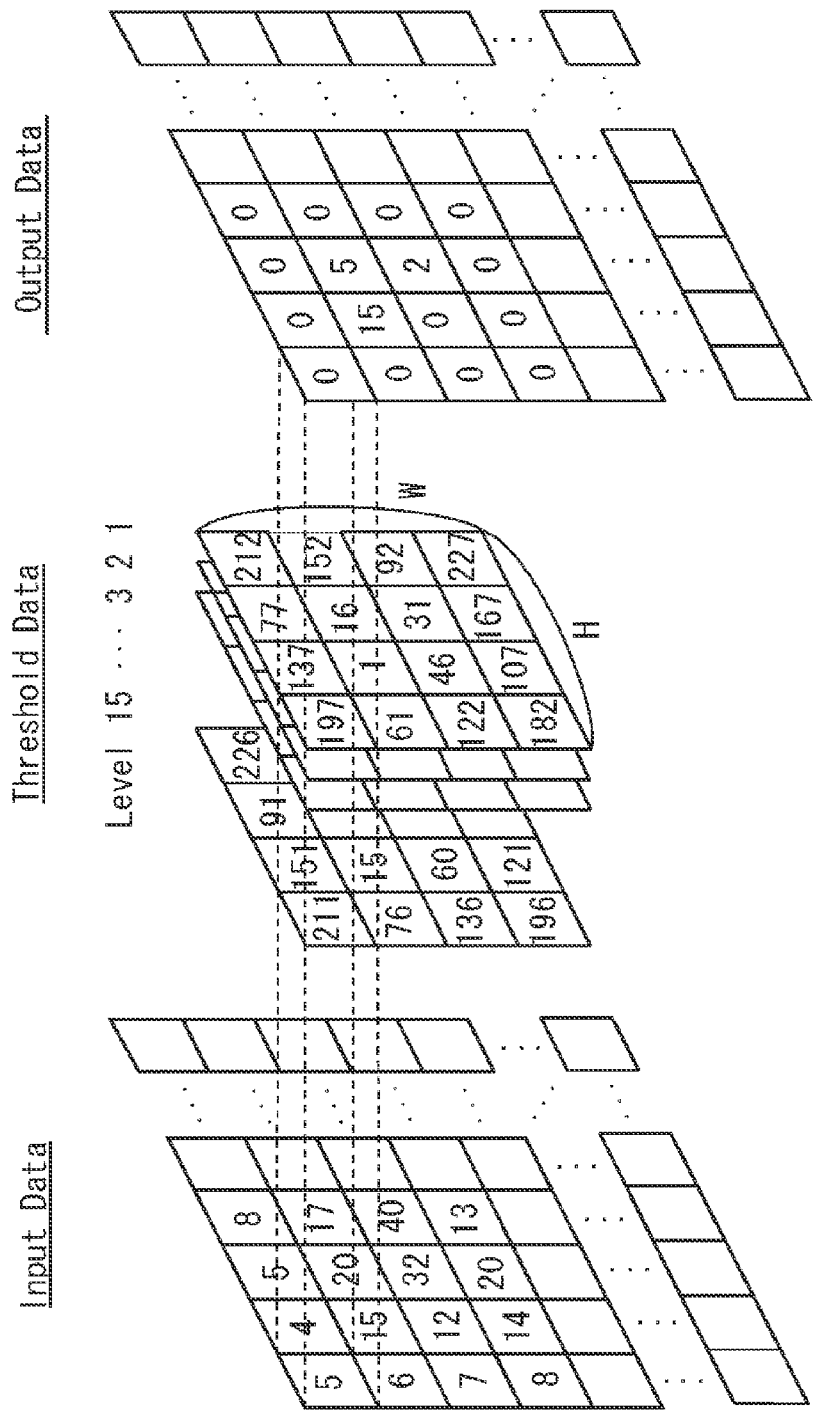
FIG. 10 illustrates a general multi-level dither method.

In the present exemplary embodiment, the divisor value is variable for each position in the divisor matrix. Therefore, the increment amount of an output value can be changed for each position in the matrix. FIG. 8 is a graph partly illustrating input/output signals of the halftone processing unit 304. FIG. 9 illustrates examples of the output result of the halftone processing unit 304.

FIG. 8 is a graph illustrating a relationship between a pixel value of print image data that can be input to the halftone processing unit 304 and an output value of the halftone processing unit 304 in a case where the coordinate position (j, i) of the basic dither matrix 601 and the divisor matrix 701 is one of (0,0) to (0,5). In FIG. 8, the abscissa axis represents the input pixel value and the ordinate axis represents the output value.

FIG. 9 illustrates example output results 901 to 906 of the halftone processing unit 304 that correspond to the basic dither matrix 601 and the divisor matrix 701. The output results 901 to 906 can be obtained by inputting same pixel values including six pixels in the width direction and six pixels in the height direction. The input pixel value increases (namely, the density increases) in ascending order from 901 to 906. The output results 901 to 906 are sequential expressions varying from white to black for each pixel using output values 0 to 15 of the halftone processing unit 304.

The basic dither values of the coordinates (0, 0) to (0, 5) are 212, 240, 184, 70, 71, and 56, respectively. The divisor values of the coordinates (0, 0) to (0, 5) are 1, 1, 1, 3, 3, and 1, respectively. As understood from FIG. 8, the coordinates (0,0), (0,1), (0,2), and (0,5) having the divisor value of 1 are different in the gradient from the coordinates (0,3) and (0,4) having the divisor value of 3. The difference in the gradient reflects a difference in the increment amount of the output value that increases according to an increase of the input pixel value.

Namely, when different divisor values are used for respective coordinate positions, the increment amount of the output value corresponding to the input pixel value can be arbitrarily changed for respective coordinates. Therefore, as illustrated in FIG. 9, the divisor value for a position to be grown can be set as a low value in the low and high-density regions so as to realize a dither that can cause the pixel to grow in a dot-like fashion pixel by pixel.

Moreover, the divisor value for a position to be grown can be set as a high value in the medium density region and these divisor values can be aligned in a line state in the divisor matrix, so as to realize a dither that causes the halftone dot to grow while changing the halftone dot pattern, for example, by changing every three pixels in a linear fashion.

As described above, when the divisor value is variable for each position in the divisor matrix, the increment amount of the output value can be changed for each density region and an appropriate combination of halftone dot patterns can be realized. Accordingly, for example, a smooth image can be expressed by increasing the output value in a linear fashion in the medium density region. If a dot-like expression is used for the increment of the output value in the low-density region or in the high-density region, the reduction in reproducibility, which may be caused by the expression used for a line-state halftone dot pattern, can be prevented.

As described above, in a case where divisor values are changed for respective positions in the divisor matrix, it is desired to dispose the positions having the same divisor values in a line state and set a plurality of basic dither values whose values are close to each other (e.g., within a difference of 1) for corresponding positions in the basic dither matrix. This is because an increase in the gradation, which may be caused when an input pixel value slightly changes, can be expressed by using the basic dither values disposed in a line state. For example, in the divisor matrix 701, the positions having the divisor value of 3 are disposed obliquely in a line state. In the basic dither matrix 601, the basic dither values of corresponding positions are within the difference of 1, as understood from (113, 114, 115) and (70, 71, 71).

Further, in a case where the same divisor values are disposed in a line state, it is desired that the divisor value is identical or similar to the disposition number of the same divisor values. For example, in a case where the divisor value is 1, the output value increases by one in response to an increase of the input pixel value by one. On the other hand, in a case where the divisor value is 3, the output value increases by one in response to an increase of the pixel value by three.

Therefore, if three consecutive divisor values of 3 are disposed in a line state and the corresponding basic dither values are within the difference of 1 as described above, three output values disposed in a line state can be sequentially increased in response to a change of the input pixel value that may change by increments of 1.

In this case, if the disposition of the same divisor values is shorter than the divisor value, the output value may not increase even when the input pixel value increases. If the disposition of the same divisor values is longer than the divisor value, the output values of a plurality of positions may increase when the input pixel value increases.

In these cases, an image may deteriorate in its reproducibility. Therefore, in a case where the same divisor values are disposed in a line state, it is desired that the divisor value is identical or similar to the disposition number of the same divisor values.

To obtain the effects brought by changing basic dither values and divisor values in respective positions in each matrix, it is desired that the operation unit 104 or another remote UI enables users to set basic dither values and divisor values.

The present exemplary embodiment uses two matrices (i.e., the basic dither matrix 601 and the divisor matrix 701). However, another exemplary embodiment can use only the divisor matrix 701 and can change the gradation of image data to be printed based on the division using the divisor value.

An exemplary embodiment of the present invention is, for example, applicable to a system, an apparatus, a method, a program, or a storage medium. More specifically, the present invention can be applied to a system including a plurality of devices or can be applied to an apparatus including a single device.

A storage medium storing software program code (which corresponds to the flowcharts of the above-described exemplary embodiments illustrated in the drawings) for realizing the functions of the above-described exemplary embodiments can be supplied directly, or from a remote place, to a system or an apparatus. A computer (or CPU or micro-processing unit (MPU)) in the system or the apparatus can execute the program code to realize the functions of the above-described exemplary embodiments.

In this case, the program code itself read out of the storage medium and installed on a computer to realize the functions and processes according to the above-described exemplary embodiments can realize the present invention. The present invention encompasses the computer program itself that can realize the above-described functions and processes according to the exemplary embodiments of the present invention.

In this case, equivalents of programs (e.g., object code, interpreter program, and OS script data) are usable if they possess comparable functions. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD (DVD-ROM, DVD-R)).

The method for supplying the program includes accessing a website on the Internet using the browsing function of a client computer, when the website allows each user to download the computer program of the present invention, or compressed files of the programs having automatic installing functions, to a hard disk or other recording medium of the user. Further, the program code constituting the program of the present invention is dividable into a plurality of files so that respective files are downloadable from different websites. Namely, the present invention encompasses World Wide Web (WWW) servers that allow numerous users to download the program files so that their computers can realize the functions or processes according to the present invention.

Moreover, enciphering the program according to the exemplary embodiments of the present invention and storing the enciphered program on a CD-ROM or comparable storage medium are an exemplary method when the program of the present invention is distributed to users. The authorized users (i.e., users satisfying predetermined conditions) are allowed to download key information from a website on the Internet. The users can decipher the program with the obtained key information and can install the program on their computers. When the computer reads and executes the installed program, the computer can realize the functions of the above-described exemplary embodiments.

The computer can execute the read program to realize the functions of the above-described exemplary embodiments. Moreover, an operating system (OS) or other application software running on a computer can execute part or all of actual processing based on instructions of the programs to realize the functions of the above-described exemplary embodiments.

Additionally, the program code read out of a storage medium can be written into a memory of a function expansion board inserted in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-159321 filed Jun. 18, 2008, which is hereby incorporated by reference herein in its entirety.

What is claimed is:

1. An image forming apparatus comprising:
a storage unit configured to store a divisor matrix including at least two kinds of divisor values; and
a changing unit configured to change M (M>N) gradation image data into N (N>3) gradation image data,
wherein the changing unit is configured to divide a pixel value of a target pixel of the M gradation image data by a divisor value corresponding to a pixel position of the target pixel to change the M gradation image data into the N gradation image data,
wherein the storage unit is configured to store a basic dither matrix including basic dither values that are variable for respective positions in the matrix, and
wherein the changing unit is configured to subtract a basic dither value corresponding to the pixel position of the target pixel from the pixel value of the target pixel of the M gradation image data, and to divide the subtracted pixel value of the target pixel of the M gradation image data by a divisor value corresponding to the pixel position of the target pixel, to change the M gradation image data into the N gradation image data.

2. The image forming apparatus according to claim 1, wherein the changing unit is configured to obtain an integer value resulting from the division and to set the obtained integer value as a pixel value of the target pixel of the N gradation image data.

3. The image forming apparatus according to claim 2, wherein the changing unit is configured to set 0 as a value corresponding to the pixel of the N gradation image data if the integer value is equal to or less than 0, and to set N−1 as the value corresponding to the pixel of the N gradation image data if the subtraction result is greater than 0 and the division result is equal to or greater than N−1.

4. The image forming apparatus according to claim 2, wherein the changing unit is configured to round up a decimal part to obtain the integer value resulting from the division.

5. The image forming apparatus according to claim 1, wherein a maximum value of the basic dither values is M−N.

6. The image forming apparatus according to claim 1, wherein if the divisor matrix has a width of W and a height of H, the divisor value is equal to or less than W×H.

7. The image forming apparatus according to claim 1, wherein a divisor value of the divisor matrix that corresponds to a medium density region with respect to the basic dither values of the basic dither matrix is higher than a divisor value of the divisor matrix that corresponds to a low density or high density region with respect to the basic dither values.

8. The image forming apparatus according to claim 7, wherein the same divisor values of the divisor matrix that correspond to the medium density region with respect to the basic dither values of the basic dither matrix are disposed in a line state, and the basic dither values corresponding to the line state disposition are values that are close to each other.

9. An image forming apparatus comprising:
a storage unit configured to store a divisor matrix including at least two kinds of divisor values and a basic dither matrix including basic dither values that are variable for respective positions in the matrix,
wherein a divisor value of the divisor matrix that corresponds to a medium density region with respect to the basic dither values of the basic dither matrix is higher than a divisor value of the divisor matrix that corresponds to a low density or high density region with respect to the basic dither values; and a changing unit configured to change M (M>N) gradation image data into N (N>3) gradation image data, wherein the changing unit is configured to subtract a basic dither value corresponding to the pixel position of the target pixel from the pixel value of the target pixel of the M gradation image data, and to divide the subtracted pixel value of the target pixel of the M gradation image data by a divisor value corresponding to the pixel position of the target pixel, to change the M gradation image data into the N gradation image data.

10. An image processing method comprising:

storing, in a storage unit, a divisor matrix including at least two kinds of divisor values;

changing M (M>N) gradation image data into N (N>3) gradation image data by dividing a pixel value of a target pixel of the M gradation image data by a divisor value corresponding to a pixel position of the target pixel;

storing, in the storage unit, a basic dither matrix including basic dither values that are variable for respective positions in the matrix; and subtracting a basic dither value corresponding to the pixel position of the target pixel from the pixel value of the target pixel of the M gradation image data, and dividing the subtracted pixel value of the target pixel of the M gradation image data by a divisor value corresponding to the pixel position of the target pixel, to change the M gradation image data into the N gradation image data.

11. The image processing method according to claim 10, further comprising obtaining an integer value resulting from the division and setting the obtained integer value as a pixel value of the target pixel of the N gradation image data.

12. The image processing method according to claim 11, further comprising setting 0 as a value corresponding to the pixel of the N gradation image data if the integer value is equal to or less than 0, and setting N−1 as the value corresponding to the pixel of the N gradation image data if the subtraction result is greater than 0 and the division result is equal to or greater than N−1.

13. The image processing method according to claim 11, further comprising rounding up a decimal part to obtain the integer value resulting from the division.

14. The image processing method according to claim 10, wherein a maximum value of the basic dither values is M−N.

15. The image processing method according to claim 10, wherein if the divisor matrix has a width of W and a height of H, the divisor value is equal to or less than W×H.

16. The image processing method according to claim 10, wherein a divisor value of the divisor matrix that corresponds to a medium density region with respect to the basic dither values of the basic dither matrix is higher than a divisor value of the divisor matrix that corresponds to a low density or high density region with respect to the basic dither values.

17. The image processing method according to claim 16, wherein the same divisor values of the divisor matrix that correspond to the medium density region with respect to the basic dither values of the basic dither matrix are disposed in a line state, and the basic dither values corresponding to the line state disposition are values that are close to each other.

18. A non-transitory computer-readable storage medium storing a program that causes a computer to execute the image processing method according to claim 10.

* * * * *